United States Patent [19]

Stouffer

[11] Patent Number: 4,672,886
[45] Date of Patent: Jun. 16, 1987

[54] OSCILLATING AIR STREAM APPARATUS FOR AUTOMOBILE DEFROSTER

[75] Inventor: Ronald D. Stouffer, Silver Spring, Md.

[73] Assignee: Bowles Fluidics Corporation, Columbia, Md.

[21] Appl. No.: 737,609

[22] Filed: May 24, 1985

[51] Int. Cl.⁴ .......................... B60H 1/00; B05B 1/26
[52] U.S. Cl. .......................................... 98/2.09; 98/2;
 98/2.05; 137/606; 137/803; 239/545
[58] Field of Search .................... 239/284 R, 407, 418,
 239/420, 518, 499, 521, 543–545, 592–594;
 98/2, 2.08, 2.09, 2.05, 40.01; 137/803, 808, 606

[56] References Cited

U.S. PATENT DOCUMENTS

| 986,946 | 3/1911 | Saxon | 239/499 |
|---|---|---|---|
| 3,066,894 | 12/1962 | Davidson | 239/543 |
| 3,367,581 | 2/1968 | Kizilos et al. | 239/289 |
| 3,537,465 | 11/1970 | Moore | 137/808 |
| 3,696,828 | 10/1972 | Bjornson et al. | 137/81.5 |
| 3,832,939 | 9/1974 | Kakei et al. | 98/2.09 |
| 3,853,617 | 12/1974 | Lechner | 137/824 |
| 4,002,293 | 1/1977 | Simmons | 239/421 |

FOREIGN PATENT DOCUMENTS

| 2003697 | 1/1971 | Fed. Rep. of Germany . |
|---|---|---|
| 2338328 | 12/1976 | Fed. Rep. of Germany . |
| 2340749 | 1/1977 | Fed. Rep. of Germany . |
| 2847678 | 5/1980 | Fed. Rep. of Germany . |

Primary Examiner—Andres Kashnikow
Assistant Examiner—Kevin Patrick Weldon
Attorney, Agent, or Firm—Jim Zegeer

[57] ABSTRACT

Air is detected from opposing ends of a trough-like continuous contour which defines a guide path for the two opposing streams. The air streams will be attached to flow along the trough and where the oppositely directed streams impact or impinge upon each other, they will be deflected normal to their path and the two combined streams will be projected or directed perpendicularly outwardly from the trough in the form of a fan-shaped jet. By controlling the velocity of the two opposing jets, the point of impact or impingement of the two jets can be moved along the trough with the trough defining the path of movement of the point or virtual outlet of outward projection of the combined jets. In preferred embodiments, the defrost and heating and air conditioning outlets for automobiles incorporate the invention so as to avoid protrusions and provide a continuous clean and unbroken appearance.

16 Claims, 13 Drawing Figures

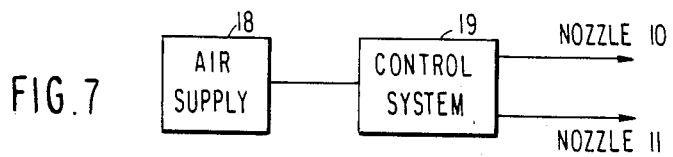
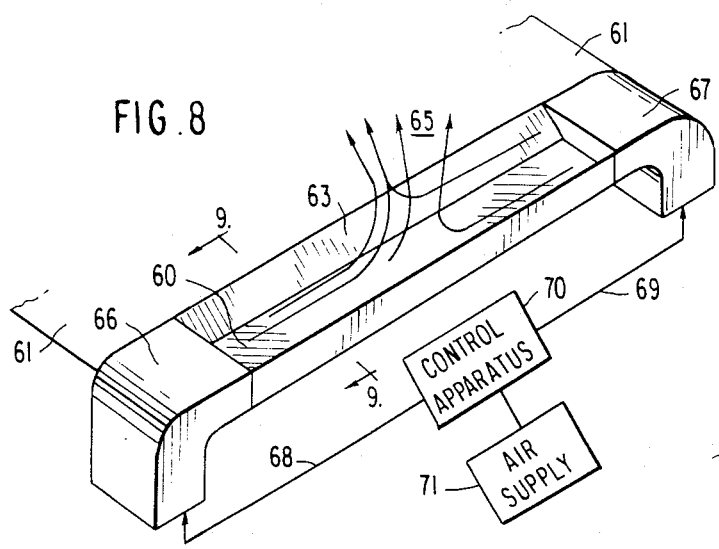
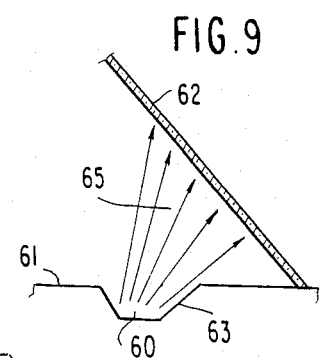
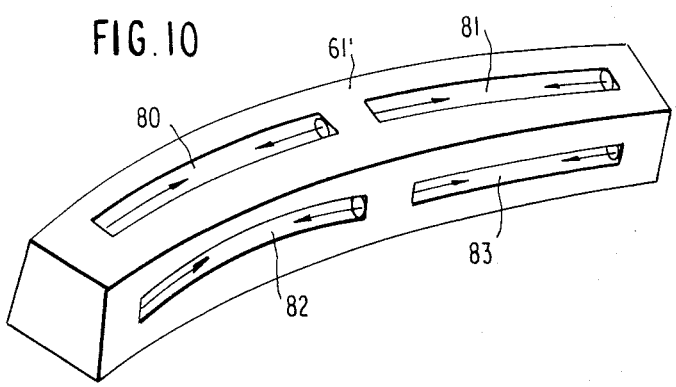
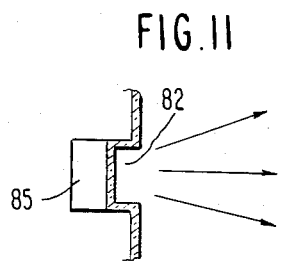

OSCILLATING AIR STREAM APPARATUS FOR AUTOMOBILE DEFROSTER

BACKGROUND OF THE INVENTION

Air distribution outlets which receive air under pressure for heating and cooling purposes in automobiles and for clearing windshields of fog, ice and frost utilizing fluidic systems are well known in the art. In automobiles in particular, there has always been a design problem with such outlets which are, of course, a necessity both for the safe operation of the vehicle and for comfort of passengers. Typically the outlets are grills and/or adjustable vanes for directing air and recently, fluidic elements have been utilized in air outlet nozzles to control the direction of air flow and to provide for swept jet air flow into the passenger compartment of a vehicle and upon the windshield to clear same.

Impact modulators are well known in the art and usually comprise two input power streams or jets in which the streams impinge against one another coaxially in a common zone and the point of impact or impingement of the jets upon one another is projected in a given direction, and Moore U.S. Pat. No. 3,537,465 assigned to the assignee hereof is essentially a typical example of such a device. Kizilos et al. U.S. Pat. No. 3,367,581 discloses a fluid amplifier for performing a "jet-flap like function" and utilizes a cylindrical surface with a pair of jets projected along in oppositely tangential directions so that when the two streams meet on the surface, a single stream is formed which flows outward from the surface in a direction from a position on the cylindrical surface determined by the relative strenghts of the first and second lfuid streams so that control of the single stream by varying the relative strengths of the first and second streams is thus known in the art.

A basic object of the invention is to provide an improved air distribution and control system and method.

Another object of the present invention is to provide an air distribution system and method for automobiles which has no protrusions and no large openings on the occupant facing vertical surfaces.

According to the invention, an elongated air flow channel trough or groove is provided with a pair of nozzles at each end of the channel, trough or groove and connected to a source of air under pressure, each of the nozzles projecting an air jet along the axis of the trough or groove but in substantially opposite directions so that when the two air jets impact or impinge somewhere along a path defined by the trough or groove and where the two jets impact or impinge the air combines and is projected forwardly or outwardly in a direction normal to the channel, trough or groove and thus creat a virtual or invisible outlet. A further feature of the invention is that the velocity or strength of each jet is modulated to adjust the position of the virtual outlet. A further feature is the modulation of the velocity or strength of each jet in alternate and opposite directions to cause the virtual outlet and the projected air jet to move transversely of the axis of the groove or trough and thus sweep back and forth along a path defined by the trough or groove. The invention is particularly useful in connection with automobile instrument panel air control systems since there are no protrusions and it has a continuous clean appearance in the outlet and the two nozzles are substantially invisible and thus do not intrude upon the aesthetics of the instrument panel. The control of air issuing through the two opposing nozzles can be controlled by electrical means or by fluidic means. That is to say, the modulation of velocity of the air issuing through the two opposing nozzles can be controlled by electrically operated valves or by fluidically operated valves. The spot or oscillatory modes can be selected at will by the operator. As noted earlier, the motion fo the impact or impingement area of the two jets is controlled by the differential energy contained by the two supply jets or nozzles. This energy can, in turn, be controlled by a variety of ways such as a variable physical constriction of the flow area either by mechanical obstacle, iris or a gate valve or by electromechanically driven means or by a manually driven gate. The energy can also be controlled by a variable "apparent" constriction of the flow area by a fluidic means such as an air pressure control port transverse to the flow at the pair of nozzles or by pressurized control ports radial to the stream diameter causing rotational flow. In addition, the energy of the two jets can be controlled by bleeding one or the other supply nozzles by means of a mechanical valve, either manual or electromagnetically operated or by control port to variable pressure (vacuum) supply. Oscillation can be controlled by an electromagnetic valve or by fluidic means. By fluidic means it is intended to include cross coupling of each nozzle's supply pressure via a control tube, controlling nozzle control ports by a small pilot or fluidic oscillator. In the case of an automobile compartment, for example, the trough or groove can be formed of transparent plastic so that is can pass in front of or be an integral part of some of the instruments without in any way interfering with the visability.

BRIEF DESCRIPTION OF THE DRAWINGS

The above and other objects, advantages and features of the invention will become more apparent when considered with the followin specification when considered with the accompanying drawings wherein:

FIG. 7 is a block diagram of a control system incorporated in the invention, FIG. 8 is an isometric view of a defrost system incorporating the invention in which the defrost air is projected upon a windshield, FIG. 9 is a sectioanl view taken on lines 9—9 of FIG. 8, FIG. 10 is a diagrammatic representation of an automobile instrument panel or dashboard incorporating the invention for both defrost/defog operation and heating and air condition use, and FIG. 11 is a sectioanl view taken on lines 11—11 of FIG. 10 showing the positioning of an instrument display behind a transparent portion of a channel or trough incorporating the invention.

DETAILED DESCRIPTION OF THE INVENTION

Figure 1:
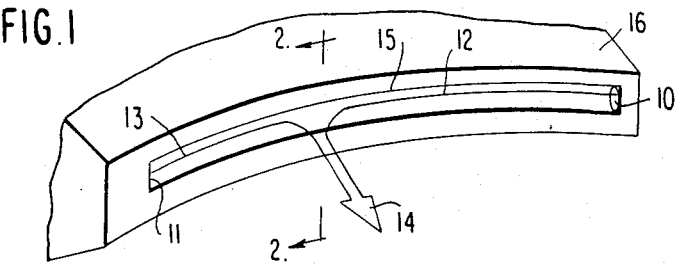
FIG. 1 is a partial isometric view of an air distribution device incorporating the invention.

Referring now to FIG. 1, a pair of nozzles 10 and 11 project air jets 12 and 13, respectively, toward each other along an opening sided common channel trough or groove 15 formed in a support structure 16 and, depending upon the velocity or energy of the two streams, the combined jet 14 is projected outwardly from a point determined by the relative strength of the two jets 12 and 13. The point of outward projection constitutes a virtual outlet, the two nozzles having openings which are approximately normal to the viewer. In the embodiment illustrated in FIG. 1, jet 12 has a strength relatively greater than jet 13 so that the combined jet 14 is projected outwardly from the trough or groove 15 to the left of the center line and closer towards the nozzle 11 and more distant from the nozzle 10. This is illustrated schematically in FIG. 6 where the jets 12 and 13 and their relative strengths are indicated to show the positioning of the resulting combined jet due to the differential in velocities of the two jets. FIG. 7 is a schematic block diagram illustrating an air supply 18 supplying air to a control system 19 which, in turn, supplies air to the nozzles (10).

The motion of the impact area or where the jet is projected from the trough is controlled by the differential energy contained by the two jets 13 and 14. This energy can in turn be controlled by a variety of means:
1. Variable physcial constriction of the flow area
   (a) mechanical
      (1) obstacle
      (2) iris
      (3) gate (value)
   (b) electromechanically driven
   (c) manually driven
2. Variable "apparent constriction" of the flow area by fluidic means
   (a) pressurized control port - transverse to flow
   (b) pressurized control port - radial to stream diameter causing rotation flow
3. Bleeding one or the other supply nozzle
   (a) mechanicl value
      (1) manual
      (2) electromagnetic
   (b) control port to variable pressure (vacuum) supply.

Oscillation can be controlled by an electronically controlled electromagnetic value or by fluidic means.
Fluidic means include:
   (1) cross-coupling of each nozzle's supply pressure via control tube.
   (2) nozzle's control ports controlles by small pilot fluidic oscillator.

The particular instrumentalities utilized for such control are not germane to the present invention but, suffice to say that for example, the control disclosed in Kizilos et al. U.S. Pat. No. 3,387,581 can be utilized as one form of control. Alternatively, the electromagnetic control of fluidics shown in Izumi et al. U.S. Pat. No. 4,393,897 or Kakie et al. 3,832,939 or 3,745,906 may be utilized.

Figures 2A, 2B, 2C:
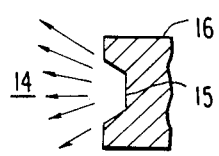
FIG. 2a is a sectional view taken on lines 2—2 of FIG. 1, FIGS. 2b-2c are sectional views of alternate trough or channel elements.

As shown in FIG. 2a, the trough can have the sidewalls angled slightly so as to projet a fan or wedge-shaped section of air; or the shape can be "C" shaped as shown in FIG. 2b or "U" shaped as shown in FIG. 2c.

Figure 6:
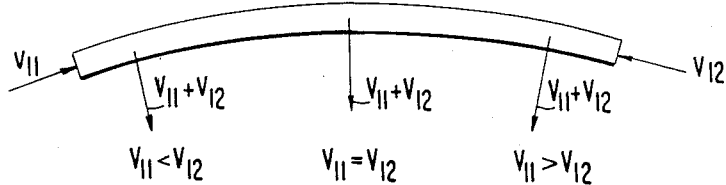
FIG. 6 is a schematic diagram illustrating the effect of differential energy (velocity) of the two opposing jets and how that effect is used to position the point of projection of the combined streams in a particular direction.

Although the specific dimensions of the channel or trough is determined by the volume of air flow, inter alia, a specific example of the channel shwon in FIG. 2c would be about 3" in a virtual direction by 1½" in depth. The air will be attached to flow along the trough and where the two oppositely directed steajs 12 and 13 impact, they will turn 90 degrees (in this embodiment) to their path of travel and the combined stream 14 will be directed perpendicularly from the virtual outlet into the ambient, which in the preferred embodiment is a passenger compartment and in the form of a fan-shaped jet. The point of impact will be static in the center if the jets have equal energies (equal velocity) but if one nozzle is of lower velocity, the point of impact will be moved toward the lower velocity nozzle as is indicated in FIG. 6. If the nozzle's velocity is controlled differentially and alternately so that as one nozzle velocity is increased the other is lowered, the point of impact and virtual outlet can be caused to oscillate between the right and left locations. The nozzles can, of course, be oriented so that the trough runs vertically or at any other angle inclination as may be desired and may be curved as shown for the driver's side 82 of FIG. 10. The nozzles can be operated therefore in a static spot mode in any desired location horizontally or oscillation can be controlled to cause the virtual outlet to course back and fourth over settable limits. As noted earlier, the control can be executed by controlling by electrical means or fluidic means or manual means. That is, the modulation of velocity can be controlled by electrically operated valves as is the case of Izumi et al. Patent 4,393,897 refered to above, or by fluidic operated valves. The spot or oscillatory modes can be selected by the operator.

Figure 3:
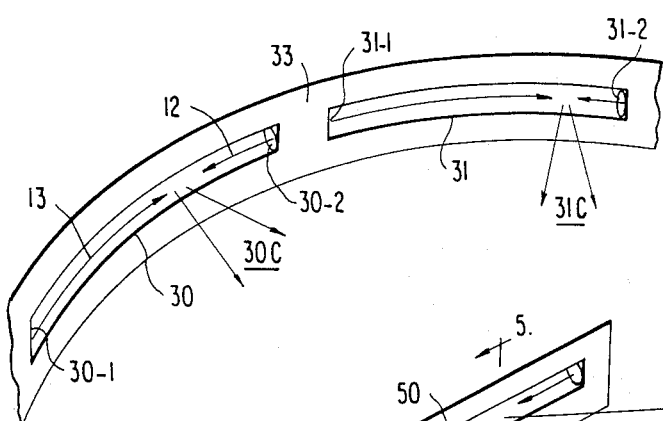
FIG. 3 is a isometric view of a further embodiment of the invention wherein a pair of separately controllable air distribution units incorporating the invention are provided in the dash of an automobile.
Figure 4:
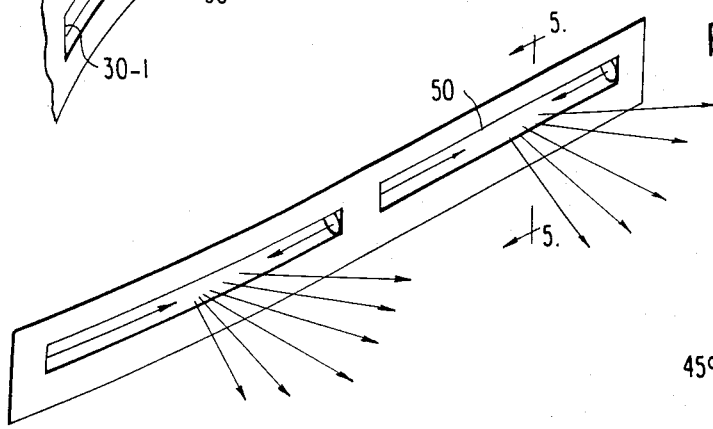
FIG. 4 is a similar view in which one of the channels or troughs is concave and one is straight.
Figure 5:
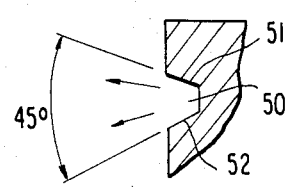
FIG. 5 is a sectional view on lines 5—5 of FIG. 4.

In FIG. 3, two horizontally oriented channels, troughs or slots 30 and 31 are provided in the dash or instrument panel 33 of a vehicle, each of the troughs or slots having their own opposed nozzle pairs 30-1 and 30-2, and 31-1 and 31-2, respectively, with each trough or slot 30 and 31 projecting their own individual combined jets 30C and 31c, respectively, which, in this embodiment, is fan or wedge-shaped as indicated in FIG. 2. In FIGS. 1 and 3, the troughs are indicated as being concave along their axial length which is a preferred embodiment. However, the troughs can be straight or linear or convex along their axis as is indicated in FIG. 4. As shown in FIG. 5, the trough 50 has the legs thereof 51 and 52 angled so as to provide about a 45 degree wedge shape for the issued or projected combined air jets.

for use in clearing a windshield, the trough 60 is formed in the upper surface 61 of the instrument panel or dash of the vehicle and the projected wedge or fan shape of fan impinges upon a glass windshield 62 as shown in FIG. 9. The side 63 of the trough is angled as shown in FIG. 9 to better direct the for or frost clearing air jet 65 upon the last windshield 62. Nozzles 66 and 67 are coupled by ducting 68, 69 to a control apparatus 70 which receives air from supply 71, the air from supply being defrost/defog air for clearing the windscreen 62. In this embodiment, the control apparatus 20 can be a fluidic oscillator driven by supply air from source 71 with the air in duct 68 and 69 being alternately and periodically pulsed so that the projected wedge-shaped combined jet 65 sweeps back and forth along a path defined by trough 60. Trough 60 can be curved as indicated in the embodiment shown in FIG. 10 in which four troughs 80, 81 and 82 are utilized, troughs 80 and 81 being defrost troughs and troughs 82, 83 being connected to a supply of cool air as from an air conditioner. In this embodiment, the trough 82 on the driver's side can be made of a transparent or clear plastic so that the instrument displays 85 can be positioned behind or formed as a part of the rear surface of the trough 82. Thus, a liquid crystal, light emitting diode or other instrument display 85 can be positioned behind the air distribution trough which permits the system to be designed to accomodate much greater varieties of instrument panel design and thereby improves the aesthetics of the automobile interior particularly in regards to the instrument panel or dashboard.

The moving point of projection actually forms a virtual outlet which is invisible to the drive and passenger. Of course, the outlets at the ends of the trough are viewable at an angle thereto but this does not detract from the overall effect of the virtual outlet which is positioned somewhere along a path defined by the trough itself.

While I have disclosed and described a preferred embodiment of the invention, it will be appreciated that various adaptations and modifications of the invention will be obvious to those skilled in the art and it is intended to encompass within the scope of the claims appended hereto such obvious modifications and adaptations.

What is claimed is:

1. An air control system for selectively controlling the direction of air flow from a source under pressure to ambient comprising,
    an air flow trough having a bottom wall running along a predetermined axis and a pair of ends at opposing ends of said bottom wall,
    a pair of nozzles at each end of said trough each one of said nozzles being oriented to project an air jet toward the opposite one of said nozzles respectively,
    means connecting each of said nozzles ot said source of air under pressure for projecting said pair of air jets, respectively, along the axis of said air flow trough in opposing directions, whereby, air is projected outwardly from said trough transversely of the axis thereof when said respective air jets contact each other.

2. The air control system defined in claim 1 wherein the strength of each jet is modulated in alternate phase to cause the air jet which is projected outwardly to mvoe transversely of the axis of said trough and sweep back and forth in synchronism with said alternate phase of each jet along a path defined by said trough.

3. The air control system defined in claim 1 including means for modulating the relative strength of at least one of said pair of air jets to adjust the position of said projected jet along the axis of said trough.

4. The air control system defined in claim 1 including control means for adjusting a parameter of one of said pair of air jets to thereby adjust the direction of air flow projected outwardly from said trough.

5. The invention defined in claim 4 wherein said control means includes a fluidic oscillator.

6. In an automobile instrument panel air control system having a source of air under pressure for distribution from said instrument panel,
    an air flow groove formed in said instrument panel having a pair of ends, and running transversely of the longitudinal axis of said automobile between said pair of ends, and a pair of nozzles at each said end, connected to said source of air under pressure for projecting a pair of air jets, respectively, along the axis of said air flow groove in opposite directions, whereby air is projected from said groove transversely to the axis thereof when said air jets impact.

7. The invention defined in claim 6 including means for modulating the relative strengths of at least one of said pair of air jets to adjust the position of said projected jet along the axis of said groove.

8. The invention defined in claim 6 wherein said groove is convex along the axis thereof and is positioned on a vertical side of said instrument panel and said source of air under pressure is a supply of heating-/air conditioning air.

9. The invention defined in claim 7 wherein the strength of each of said jet is modulated in alternate phase to caue the projected air jet to move transversely to the axis of said groove and sweep back and forth along a path defined by said groove.

10. The invention defined in claim 9 wherein said groove is positioned on an upper surface of said instrument panel such that said projected jet sweeps the windshield of said automobile.

11. Air distribution apparatus for selectively directing a jet of air onto the windshield of an motor vehicle to defrost/defog said windshield comprising:
    a trough formed in an instrument panel of said motor vehicle, said trough having a pair of ends, and a bottom extending continuously between said ends, said bottom facing said windshield,
    a pair of nozzles at each end of said trough, said nozzles being adapted to be connected to a source of defrost/defog air, and
    control means for controlling a parameter of the air issuing from at least one of said nozzles to thereby adjust the the relative impingement position of said jets and the direction relative to said trough where said jets are combined and projected outwardly toward said windshield.

12. The invention define din claim 11 wherein said control means includes an oscillator for alternatively modulating each said jets.

13. The invention defined in claim 11 wherein said parameter of the air issuing from said at least one of said nzozles is the strength of air therein.

14. Air distribution apparatus for selectively directing a jet of air into the passenger compartment of a motor vehicle comprising,
    a trough formed in said instrument panel of said motor vehicle, said trough having a pair of ends, said trough having a bottom extending continuously between said ends,
    a pair of nozzles at each end of said trough for projecting air jets therefrom, said nozzles being adapted to be connected to a source of passenger compartment air, and
    control means for controlling a parameter of air jets issuing from each said nozzle to thereby adjust the impact position of said air jets and the position along said trough where said passenger compartment air is projected outwardly into said passenger compartment.

15. The invention defined in claim 14 wherein said control means includes an oscillator for alternately modulating the strength of each of said air jets.

16. The invention defined in claim 14 wherein the parameter controlled is the strength of at least one of said air jets.

* * * * *